Patented Dec. 2, 1952

2,620,266

UNITED STATES PATENT OFFICE 2,620,266

HERBICIDES

Arthur H. Schlesinger and David T. Mowry, Dayton, Ohio, assignors to Monsanto Chemical Company, St. Louis, Mo., a corporation of Delaware No Drawing. Application January 25, 1951, Serial No. 207,854

7 Claims. (Cl. 71—2.5)

The present invention relates to herbicides and deals more particularly with methods for the general destruction of undesired plants.

A number of herbicides are known, a variety of organic and inorganic compounds having been suggested in the prior art for use as plant-killers. Among the disadvantages of known herbicides may be mentioned corrosive effect on equipment, chemical reactivity with other components customarily employed in agricultural sprays or powders, instability when exposed for long periods of time to ordinary atmospheric conditions, and soil instability, e. g., chemical reactivity with soil components and susceptibility to decomposition by soil micro-organisms, which results in loss of the active material.

Now we have found that highly stable, non-corrosive herbicidal compositions are obtained by employing, as the active ingredient a heterocyclic compound of nitrogen having the general formula:

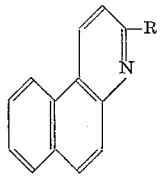

in which R is selected from the class consisting of hydrogen and alkyl radicals of from 1 to 4 carbon atoms. Compounds having the above general formula include benzo(f)quinoline and its 3- alkyl derivatives in which the alkyl radical has from 1 to 4 carbon atoms, e. g., 3-methyl-, 3-ethyl-, 3-n-propyl-, 3-isopropyl- and 3-n-butyl-benzo(f)quinoline. The benzo(f)quinoline compounds are readily available by a variety of procedures. For example, benzo(f)quinoline may be prepared from β-naphthylamine and glycerine in the presence of a dehydrating agent such as sulfuric acid and the 3-alkyl-benzo(f)quinolines are obtainable by heating with lime the alkyl-substituted benzoquinoline-carboxylic acids which are formed by reacting β-naphthylamine with an aliphatic aldehyde in the presence of hydrochloric acid according to the method of Doebner (Berichte, 27, 2020–30 (1894)).

Benzo(f)quinoline and its 3-alkyl derivatives are effective herbicides over wide ranges of concentrations. Their effectiveness may be measured by determining the inhibition of root growth as compared to similar untreated plants. The general usefulness of a herbicide may be measured by comparing the concentrations of a herbicide required to produce a certain inhibition of growth on a broad-leafed plant with the concentrations of a herbicide required to produce the same inhibition of growth on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited, by the following example.

Example

Herbicidal activity of benzo(f)quinoline and 3-methyl-benzo(f)quinoline was determined by germination of cucumber seeds for 4 days at a temperature of 76° F. in the presence of aqueous suspensions of each of the indicated chemicals at concentration of 100 p. p. m. Seventy-five seeds were used for each test. The results are expressed as per cent length of the primary roots in the presence of the chemical compared with the length of the primary roots of controls which had been germinated in water. The activity of a number of standard herbicides as obtained by the same test are included for comparison.

| Compound Tested | Percent Growth at 100 p. p. m. |
|---|---|
| Benzo(f)quinoline | 11 |
| 3-Methylbenzo(f)quinoline | 19 |

Similarly good results may be obtained with other 3-alkylbenzo(f)quinolines, e. g., 3-isopropylbenzo(f)quinoline, or 3-n-butylbenzo(f)quinoline.

The herbicidal efficiency of the present benzo-(f)quinolines is remarkable, because, as shown in the table given below, heterocyclic nitrogen compounds do not generally possess great herbicidal efficiency. When tested as described above, aqueous suspensions of a random group of such compounds were found to have the following effects:

| Compound Tested | Percent Growth at 100 p. p. m. |
|---|---|
| 2-Chloropyridine | 79 |
| Benzimidazole | 59 |
| 3,5-Dimethylpyrazole | 74 |
| 1-(8-hydroxy-5-quinolyl)-1-butanone | 72 |
| 7-Chloro-4-hydroxy-2-p-chlorophenylquinoline | 99 |
| 1-Hydroxyethylbenzotriazole | 89 |
| 2-Phenyl-1,3,4-benzoxazone | 69 |

The present compounds are preferably applied by spraying an aqueous suspension of the same, this method affording an easy and inexpensive way of destroying plant growth. However, they are likewise effective when applied in agricultural dusts; or they may be used with water-insoluble insecticides, fungicides, etc. in customarily employed organic solutions.

Herbicidal compositions containing the present quinoline compounds may be oil solution or an oil emulsion of the quinoline compound. The oil solutions may be obtained simply by dissolving the quinoline compound in oil in effective proportions. In most instances, however, it is more expedient to prepare oil concentrates of the quinoline concentrate, which oil concentrates are diluted by the consumer prior to their use. Dilution of the oil concentrates may be effected by preparing oil-in-water emulsions, i. e., by adding a small quantity of the oil concentrate to a large quantity of water. The oil concentrates may also be used for the preparation of very dilute oil solutions.

The present quinoline compounds may be made water-soluble by converting them into their salts in known manner, e. g., their hydrochlorides, sulfates, etc. The salts thus obtained are generally water-soluble compounds which often possess the herbicidal efficiencies of the parent quinoline compounds.

The aqueous suspensions may be used to destroy already existing plant growth by direct application to the undesirable plants, or they may be employed to prevent the plant growth by application to soils. When employed to prevent plant growth, for example, in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

There may be employed 0.1 part to 20 parts of the benzoquinoline compound per one-hundred parts by weight of the carrier, and in this manner an acre of land may be freed of plants by application of only a few pounds of one of the present herbicides.

What we claim is:

1. A method of destroying undesired plants which comprises applying to said plants a herbicidal composition comprising, as the active ingredient, a compound having the general formula:

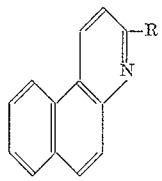

in which R is selected from the class consisting of hydrogen, and alkyl radicals of from 1 to 4 carbon atoms.

2. A method of destroying undesired plants which comprises applying to said plants a herbicidal composition including benzo(f)quinoline as the active ingredient.

3. A method of destroying undesired plants which comprises applying to said plants a herbicidal composition including 3-methylbenzo(f)-quinoline as the active ingredient.

4. A method of destroying undesired plants which comprises applying to said plants a herbicidal composition comprising a carrier and, as the active ingredient a compound having the general formula:

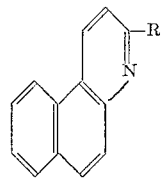

in which R is selected from the class consisting of hydrogen, and alkyl radicals of from 1 to 4 carbon atoms.

5. A method of destroying undesired plants which comprises applying to said plants an aqueous suspension of a compound having the general formula:

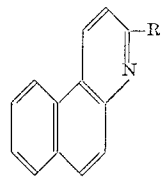

in which R is selected from the class consisting of hydrogen and alkyl radicals of from 1 to 4 carbon atoms.

6. A method of destroying undesired plants which comprises applying to said plants an aqueous suspension of benzo(f)quinoline.

7. A method of destroying undesired plants which comprises applying to said plants an aqueous suspension of 3-methylbenzo(f)quinoline.

ARTHUR H. SCHLESINGER.
DAVID T. MOWRY.

REFERENCES CITED

The following references are of record in the file of this patent:

UNITED STATES PATENTS

| Number | Name | Date |
|---|---|---|
| 2,427,677 | Knapp | Sept. 23, 1947 |

FOREIGN PATENTS

| Number | Country | Date |
|---|---|---|
| 474,433 | Great Britain | 1936 |
| 475,569 | Great Britain | 1936 |
| 817,081 | France | May 15, 1937 |
| 654,419 | France | Nov. 28, 1928 |

OTHER REFERENCES

Handbook of Chemistry & Physics, 27th ed. (1943–44), pgs. 646 and 647.